United States Patent
Poder

(10) Patent No.: US 6,679,528 B1
(45) Date of Patent: Jan. 20, 2004

(54) DEVICE FOR QUICK CONNECTION OF A TUBE PROTECTED JOINT TO A RIGID ELEMENT

(75) Inventor: Philippe Poder, Guichen (FR)

(73) Assignee: Legris SA, Rennes (FR)

( * ) Notice: Subject to any disclaimer, the term of this patent is extended or adjusted under 35 U.S.C. 154(b) by 18 days.

(21) Appl. No.: 10/019,256

(22) PCT Filed: Jun. 21, 2000

(86) PCT No.: PCT/FR00/01709
§ 371 (c)(1),
(2), (4) Date: Dec. 28, 2001

(87) PCT Pub. No.: WO01/02765
PCT Pub. Date: Jan. 11, 2001

(30) Foreign Application Priority Data

Jun. 30, 1999 (FR) .......................... 99 08369

(51) Int. Cl.⁷ .............................. F16L 35/00
(52) U.S. Cl. ................. 285/305; 285/23; 285/370; 285/320
(58) Field of Search .............. 285/3, 4, 18, 117, 285/242, 294.1, 369, 307, 379, 45, 370, 305, 320, 319

(56) References Cited

U.S. PATENT DOCUMENTS

| | | | | |
|---|---|---|---|---|
| 2,720,219 A | * | 10/1955 | Grove et al. ........... 137/630.19 |
| 3,447,819 A | * | 6/1969 | Borsum et al. ............. 285/111 |
| 3,731,955 A | * | 5/1973 | Borsum et al. ............. 285/111 |
| 3,853,336 A | * | 12/1974 | Shank ......................... 285/18 |
| 4,191,384 A | * | 3/1980 | Svedberg .................... 277/314 |
| 4,362,323 A | * | 12/1982 | Lodder et al. ................ 285/4 |
| 4,647,012 A | * | 3/1987 | Gartner ...................... 251/148 |
| 5,048,555 A | * | 9/1991 | Mieth et al. ................ 137/238 |
| 5,413,386 A | | 5/1995 | Dal Palu |
| 5,911,443 A | * | 6/1999 | Le Quere ....................... 285/3 |
| 6,231,084 B1 | * | 5/2001 | Hester et al. ................ 285/23 |

FOREIGN PATENT DOCUMENTS

| | | |
|---|---|---|
| EP | 0 031 409 | 7/1981 |
| EP | 0 549 860 | 7/1993 |

* cited by examiner

Primary Examiner—Lynne H. Browne
Assistant Examiner—Aaron Dunwoody
(74) Attorney, Agent, or Firm—Young & Thompson

(57) ABSTRACT

The device for quickly coupling a tube to an element comprises a tubular endpiece (1) subdivided along its axis (2) into a first portion (3) for connecting to the tube and a second portion (4) for coupling to the element (100), and fastening means (3.1, 15) for securing the tube to the endpiece and the endpiece to the element, the second portion (4) of the endpiece (1) possessing a groove (8) for receiving a sealing gasket (9). The endpiece (1) is fitted with a sleeve (10) for protecting the gasket (9), which sleeve is mounted to slide between a position in which it overlies the groove (8), thereby protecting the gasket (9), and a disengaged position which is offset relative to the groove (8).

12 Claims, 2 Drawing Sheets

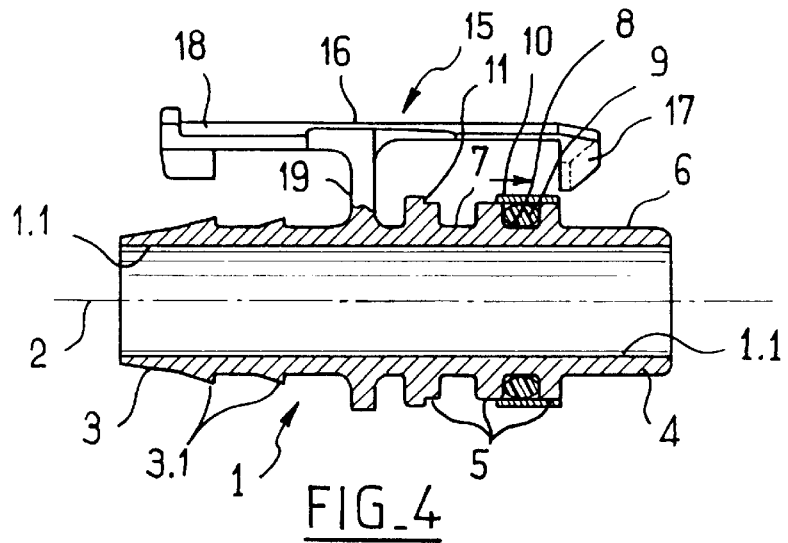
FIG_4
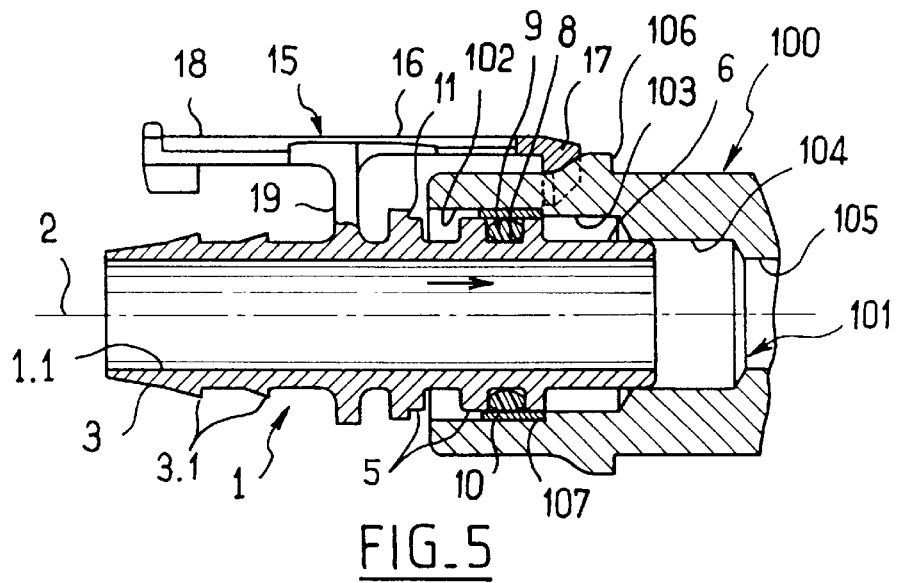
FIG_5
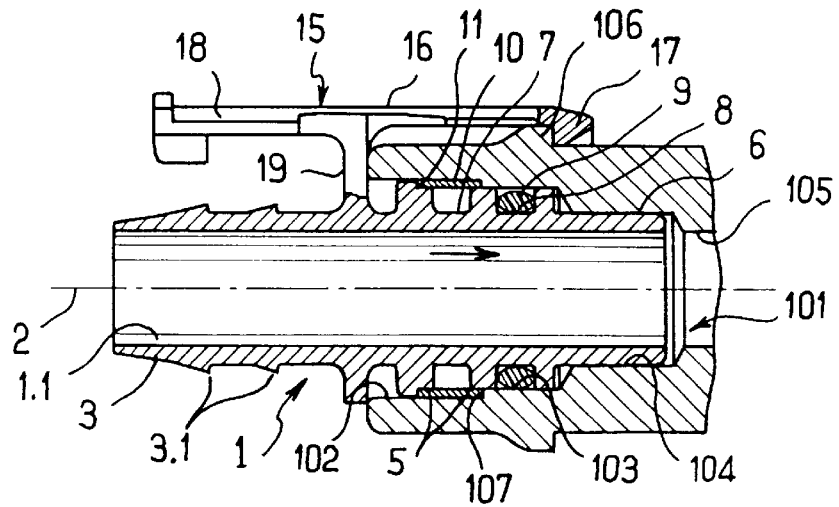
FIG_6

DEVICE FOR QUICK CONNECTION OF A TUBE PROTECTED JOINT TO A RIGID ELEMENT

BACKGROUND OF THE INVENTION

The present invention relates to a device for providing a quick coupling between a tube and a rigid element such as the body of a pneumatic or a hydraulic component.

Coupling devices are known that comprise a tubular endpiece subdivided along its axis into a first portion for connection to the tube and a second portion for coupling to the element, and fastner means for fastening the tube to the endpiece and means for fastening the endpiece to the element, the second portion of the endpiece possessing a groove for receiving a gasket that is to provide sealing between said second portion of the endpiece and the element.

During storage and transport, and during the various handling operations to which the coupling device is subjected prior to being installed, the sealing gasket is either unprotected and thus runs the risk of being degraded, or else is protected by a plug which gives rise to extra cost and extra handling. Furthermore, in either case, the gasket is not protected during mounting proper and it can therefore sometimes happen that the gasket becomes damaged by rubbing against a projecting portion of the element.

SUMMARY OF THE INVENTION

The object of the invention is to design a coupling device of the above-specified type that incorporates means for protecting the sealing gasket, which means are effective both before mounting and during mounting.

According to the invention, this object is achieved by providing for the endpiece to be equipped with a protective sleeve for protecting the gasket, which sleeve is mounted on the second portion of the endpiece to slide along the axis of the endpiece between a position where it covers the groove, in which position it protects the gasket housed in said groove before and during coupling of the endpiece to the element, and a disengaged position which is offset from the groove towards the first portion of the endpiece so as to make it possible, prior to coupling, for the gasket to be put into place in the groove, and after coupling for the gasket to come directly into contact with the element.

Thus, prior to mounting, the sealing gasket is placed in the groove of the second portion of the endpiece and the protective sleeve is placed in a position where it overlies said groove so as to protect the gasket from any external attack throughout the various stages in which the endpiece is stored, transported, and handled. During mounting, the gasket is still protected by the protective sleeve until the portion of the element which is designed to co-operate with the gasket in order to seal the coupling automatically pushes the protective sleeve into its disengaged position so as to take the place it used to occupy and thus come into direct contact with the gasket. This ensures that the gasket is protected continuously.

According to a first advantageous characteristic of the invention, the protective sleeve is prevented from moving axially over the second portion of the endpiece while it is in an initial, waiting position by weak locking means. This ensures that during transport or any other handling of the coupling device, the protective sleeve does not move in untimely manner relative to the second portion of the endpiece, since that would run the risk of putting it in a position that is undesirable for the operator and/or the machine that is to put the gasket into place in the groove.

In which case, it is advantageous for the protective sleeve to be made integrally with the second portion of the endpiece and for the locking means to consist in a zone linking the protective sleeve to the second portion of the endpiece, which zone is mechanically weak. The endpiece and the protective sleeve are thus manufactured and the sleeve is put into place on the endpiece, in a single operation, thereby simplifying manufacture and reducing cost.

According to another advantageous characteristic of the invention, the second portion of the endpiece possesses a shoulder which forms an abutment for the protective sleeve in its disengaged position. The sliding of the protective sleeve towards the first portion of the endpiece is thus limited, thereby firstly facilitating handling operations on said protective sleeve both while installing the gasket and during a coupling operation, and secondly enabling the protective sleeve itself to act as an abutment for the portion of the element which comes into contact with the gasket and which pushes said sleeve into its disengaged position, bringing it into abutment against the shoulder of the second portion of the endpiece.

Other characteristics and advantages of the invention will appear on reading the following description of a particular embodiment, given by way of non-limiting example.

BRIEF DESCRIPTION OF THE DRAWINGS

Reference is made to the accompanying drawings, in which:

FIG. 4 is a view analogous to FIG. 3, with the protective sleeve moved into its position where it covers the groove in the endpiece and the gasket it contains;

FIG. 5 is a view analogous to FIG. 4 showing the beginning of the endpiece being coupled to an element, the protective sleeve still being in its covering position where it protects the gasket; and FIG. 6 is a view analogous to FIG. 5, showing the end of coupling the endpiece to the element with the protective sleeve being pushed into its disengaged position by the portion of the element that comes into contact with the gasket.

DESCRIPTION OF THE PREFERRED EMBODIMENTS

Figure 1:
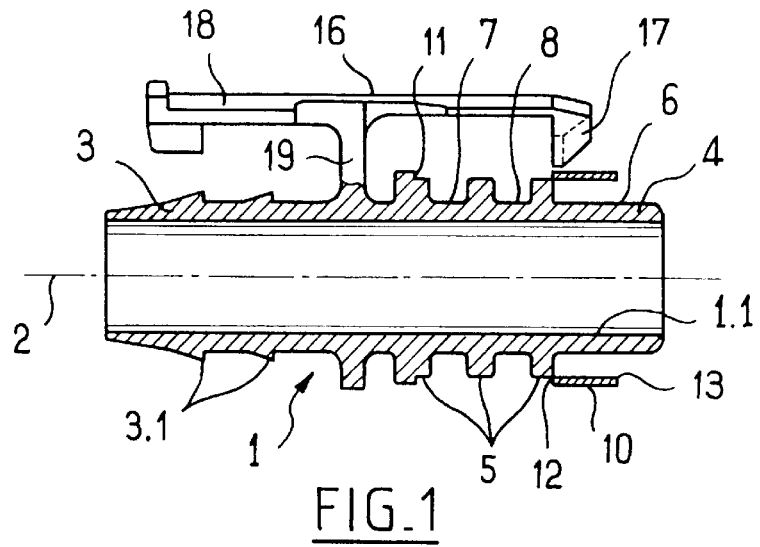
FIG. 1 is a section view on an axial plane through a coupling device of the invention with a protective gasket, the protective sleeve being in its initial or waiting position and the sealing gasket not yet being installed in the groove of the endpiece.

With reference to the figures, a quick coupling device of the invention having a protective gasket comprises a tubular endpiece 1 about an axis 2 and possessing a cylindrical inside channel 1.1. The endpiece is subdivided along its axis 2 into a first portion 3 for connection to a tube (not shown in the figures) and a second portion 4 for coupling to a rigid element 100 such as the body of a pneumatic or a hydraulic component. In the figures, the first portion 3 is situated on the left and the second portion 4 is situated on the right.

In the example shown, the endpiece 1 is an insert so its portions 3 and 4 are both male, and they are designed to be inserted respectively in the tube to be connected and in a corresponding bore 101 of the element 100.

Going from left to right, i.e. from the outside towards the inside, the bore 101 of the element 100 presents a succession of portions of decreasing diameter, comprising a large diameter first portion 102, a second portion 103 of smaller diameter than the portion 102, a third portion 104 of smaller diameter than the second portion 103, and a fourth portion 105 of smaller diameter than the third portion 104. The diameter of the fourth portion 105 is close to the diameter of the inside channel 1.1 of the endpiece 1.

A shoulder 107 is provided between the first and second portions 102 and 103 of the bore 101.

The first portion 3 of the endpiece is provided on the outside and in conventional manner with annular Christmas-tree shaped teeth 3.1 for "biting" into the inside surface of the tube so as to anchor the tube onto the first portion 3 of the endpiece 1. This non-separable connection of the tube on the first portion 3 of the endpiece 1 itself provides satisfactory sealing between the endpiece and the tube.

The second portion 4 of the endpiece 1 has an outside surface that is stepped to form two fractions: a first fraction 5 of large diameter adjacent to the first portion 3 of the endpiece 1, and a second fraction 6 of smaller diameter situated to the right of the first fraction 5. The first fraction and the second fraction 6 are for being received respectively in the second portion 103 and the third portion 104 of the bore 101 of the element 100 with a small amount of clearance.

The second portion 4 of the endpiece 1 presents two annular grooves formed as setbacks from the outside surface of the first fraction 5, one (7) being situated on the left and the other (8) being situated on the right. As shown in FIGS. 3 to 6, the right-hand groove 8 receives a gasket in the form of an O-ring 9. The diameter of the circular portion of the gasket 9 is slightly greater than the depth of the groove 8 so that when the gasket 9 is received in the groove 8 it projects radially from the first fraction 5 of the outside surface of the second portion 4 of the endpiece 1.

Figure 2:
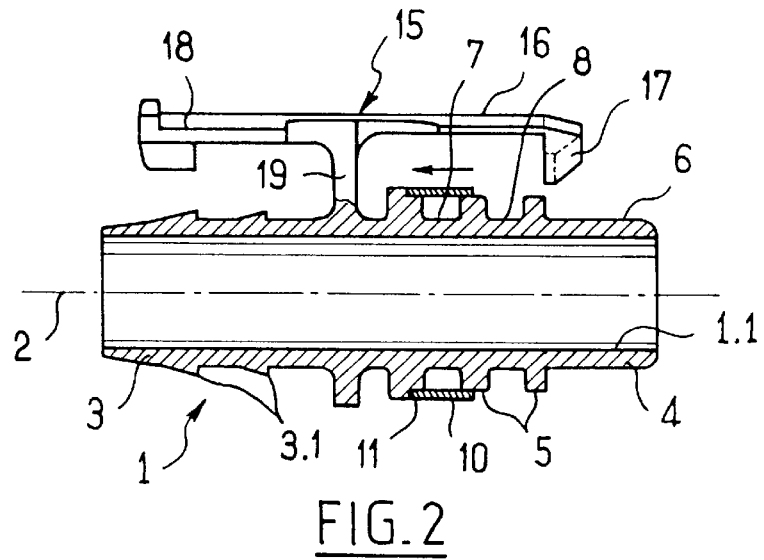
FIG. 2 is a view analogous to FIG. 1 with the protective sleeve moved into its disengaged position.
Figure 3:
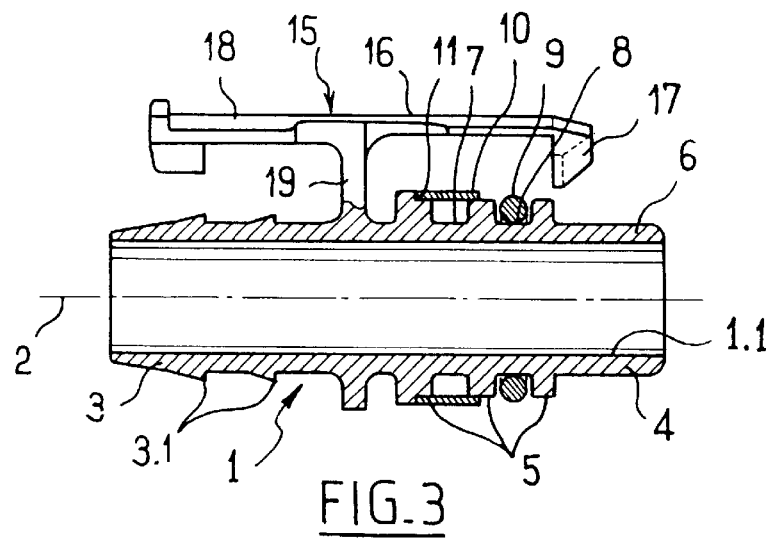
FIG. 3 is a view analogous to FIG. 2, with the gasket installed in the groove of the endpiece.

A protective sleeve 10 of rectangular section and low height, possessing an inside diameter close to the outside diameter of the first fraction 5 of the second portion 4 of the endpiece 1 is mounted on said first fraction 5 so as to be slidable along the axis 2 between two positions: a position in which it covers the groove 8, thereby protecting the gasket 9 as shown in FIGS. 4 and 5; and a disengaged position offset to the left from the groove 8, i.e. towards the first portion 3 of the endpiece 1, thereby enabling the gasket 9 to be put into place in the groove 8, and after the endpiece has been coupled to the element 100, also enabling the gasket 9 to come directly into contact with the element 100, as can be seen from FIGS. 2, 3, and 6. In the disengaged position, the protective sleeve 10 covers the left-hand groove 7.

In order to limit sliding of the protective sleeve 10 towards the left, i.e. towards the first portion 3 of the endpiece 1, the second fraction 6 of the endpiece 1 possesses a shoulder 11 adjacent to the left-hand end of the first fraction 5 of the outside surface of the second portion 4 of the endpiece 1 so as to form an abutment against which the left-hand edge of the protective sleeve 10 comes to bear when said sleeve reaches the desired disengaged position.

As can be seen in only in FIG. 1, the protective sleeve 10 is made integrally with the endpiece 1, out of molded plastics material or metal. Thus, after being fabricated, the protective sleeve 10 is cantilevered out axially from the first fraction 5 of the outside surface of the second portion 4 of the endpiece 1, extending around the second fraction 6. The sleeve 10 has a left-hand edge which is connected to the right-hand edge of the first fraction 5 via a link zone 12 that is mechanically weak. The protective sleeve 10 is thus prevented from moving axially relative to the endpiece 1 in an initial waiting position (situated, as can be seen in FIG. 1, to the right of the first fraction 5 of the second portion 6 of the endpiece 1). This temporary holding in place is performed by the weak link zone 12 and can be considered as a weak connection that can be broken merely by applying manual force to the protective sleeve 10 in a leftward direction along the axis 2, i.e. towards the first portion 3 of the endpiece 1.

Although making the protective sleeve 10 integrally with the endpiece 1 provides a genuine advantage in manufacture of the device and in keeping costs down, it is nevertheless possible to hold the protective sleeve 10 in this initial waiting position by any other means, for example by a bead or by spots of adhesive or of solder, or even by local crimping.

The protective sleeve 10 also has an inside chamfer 13 adjacent to its right-hand edge. This inside chamfer 13 serves to prevent any marking of the gasket 9 when the protective sleeve 10 slides from its overlap position towards its disengaged position, or back again, while the gasket 9 is in place in the groove 8, as explained in greater detail below.

The thickness of the right-hand edge of the sleeve 10 is equal to the height of the shoulder 107 formed between the first and second portions 102 and 103 in the bore 101 of the element 100.

The endpiece 1 is also provided with an element 15 for fastening it to the element 100. This member 15 which is integrally molded with the endpiece 1 comprises a spring blade 16 extending parallel to the axis 2, on the outside of the endpiece 1, and which is connected to the endpiece 1 between its two portions 3 and 4 by means of a lug 19. The member 15 is thus T-shaped with its upright constituted by the lug 19 and with its cross-bar being constituted by the spring blade 16. On the right of the lug 19, the spring blade 16 overlies the first fraction 5 of the outside surface of the second portion 4 of the endpiece 1 and its end is provided with a fastening catch 17 for co-operating with a corresponding outside projection 106 on the element 100. On the left of the lug 19, the spring blade 16 extends over the first portion 3 of the endpiece 1 to form a lever 18 which, when pressed towards the endpiece 1, causes the blade 16 to tilt so that the catch 17 moves away from the endpiece 1 and disengages the projection 106 of the element 100, thereby releasing the endpiece 1.

With the device as described above, a tube (not shown) can be coupled quickly to the element 100 as follows.

The endpiece 1 is initially in the configuration shown in FIG. 1. The protective sleeve 10 is in its initial, waiting position, and it is held in this position by its weak link zone 12 joining it to the endpiece.

Before the gasket 9 is put into place in the groove 8, the protective sleeve 10 is pushed to the left with sufficient force to break the link zone 12. The sleeve 10 then slides over the first fraction 5 of the second portion 4 of the endpiece 1 so as to reach its disengaged position where it comes into abutment against the shoulder 11, as shown in FIG. 2. If it is desired to achieve good sealing, it is desirable to ensure that the gasket 9 is not put into place in the groove 8 until the protective sleeve 10 has reached its disengaged position since otherwise the inside corner of the left-hand edge of the sleeve 10 which has just had its link with the endpiece 1 broken and which therefore presents rough irregularities, could damage the gasket 9 by scraping against it.

Once the protective sleeve 10 is properly placed in its disengaged position, the gasket 9 is put into place in the groove 8, as shown in FIG. 3.

The protective sleeve 10 is then slid to the right over the endpiece 1 so as to take up its position overlying the groove 8 and thus also the gasket 9 received therein, as shown in FIG. 4. It will be observed that during this sliding of the protective sleeve 10 from its disengaged position into its overlying position, the gasket 9 is protected from any sharp scraping, particularly against the right-hand edge of the protective sleeve 10 since its inside chamfer 13 forms a ramp ensuring that the gasket 9 is compressed progressively and it has no sharp corners that could mark the gasket.

In the configuration of FIG. 4, the endpiece fitted with the gasket 9 can be stored, transported, and handled without any risk of the gasket 9 being damaged since the gasket is fully protected by the sleeve 10 which masks it.

Starting from this protected configuration shown in FIG. 4, the second portion 4 of the endpiece 1 can be coupled to the element 100 in the manner described below with reference to FIGS. 5 and 6.

In the FIG. 4 configuration, the second portion 4 of the endpiece 1 is inserted along the axis 2 into the bore 101 of the element 100.

When the right-hand edge of the protective sleeve 10 comes into abutment against the shoulder 107 formed between the first and second portions 102 and 103 of the bore 101 of the element 100, as shown in FIG. 5, the insertion force exerted on the endpiece 1 along the axis 2 towards the right forces the protective sleeve 10 to slide over the first fraction 5 of the outside surface of the second portion 6 of the endpiece 1 towards the left, i.e. towards the disengaged position, thereby progressively disengaging the gasket 9 housed in the groove 8. In this case also, the presence of the inside chamfer 13 on the right-hand edge of the protective sleeve 10 serves to avoid any harmful marking of the gasket 9 while the sleeve 10 is sliding, and in particular while its right-hand edge is sliding over the gasket. Furthermore, since the height of the shoulder 107 in the bore 101 is equal to the thickness of the right-hand edge of the protective sleeve 10, the inside surface of the sleeve 10 is continuous with the surface of the portion 103 of the bore 101, and as a result when the gasket 9 passes between the sleeve 10 and the portion 103 of the bore 101, no roughness nor any setback runs the risk of damaging the gasket 9 by rubbing against it. Furthermore, since the gasket 9 is then compressed by the sleeve 10, it does no more than conserve this compressed state while the portion 103 of the bore 101 of the element 100 takes the place of the sleeve 10 in contact with the gasket 9, such that no insertion force is required to urge the endpiece 1 into the element 100 for the purpose of compressing the gasket 9.

The second portion 4 of the endpiece 1 continues to be inserted into the bore 101 of the element 100 until the protective sleeve 10 comes into abutment against the shoulder 11 of the endpiece 1, in the disengaged position.

In this final configuration as shown in FIG. 6, the second portion 103 of the bore 101 of the element 100 has taken the place of the protective sleeve 10 in receiving the groove 8 in the endpiece 1 and in coming directly into contact with the gasket 9. Thus, in this configuration, the protective sleeve 10 is received in the first portion 102 of the bore 101 of the element 100, while the first and second fractions 5 and 6 of the second portion of the endpiece 1 are received respectively with little clearance in the second and third portions 103 and 104 of the bore 101. The inside duct 1.1 of the endpiece 1 extends in line with the fourth portion 105 of the bore 101.

Furthermore, in the final configuration as shown in FIG. 6, the catch 17 of the fastening member 15 engages the outside projection 106 of the element 100 so as to hold the endpiece 1 in this final position with the second portion 4 inserted in the bore 101 against any force tending to tear out the endpiece 1 (as can result from traction being applied mechanically or as a result of hydraulic or pneumatic pressure being applied to the resulting coupling).

Finally, to finish off coupling, the tube (not shown in the figures) has its end engaged on the first portion 3 of the endpiece 1 where it is automatically anchored by the teeth 3.1 "biting" into its inside surface so as to oppose any axial tearing-off force.

The invention is not limited to the embodiment descried above, but on the contrary it covers any variant using equivalent means to reproduce its essential characteristics.

In particular, the dispositions of the invention described concerning a male coupling endpiece can also be implemented with a female coupling endpiece, in which case the gasket is received in a groove formed in the cylindrical surface of the bore of said female endpiece and the protective sleeve can slide over this inside surface.

Furthermore, although the protective sleeve is made integrally with the remainder of the endpiece in the example described with reference to the accompanying drawings, it would also be possible to make a device in which the sleeve is separate from the endpiece and is merely fitted thereto by being slid onto it. In addition, regardless of whether the sleeve is integral with the endpiece or is separate therefrom, it is not essential for it to be put into the disengaged position before the gasket is installed. This is indeed preferable, as mentioned above, particularly when the sleeve has a left-hand inside edge (relative to the orientation of the accompanying drawings) that is rough and that could damage the gasket on passing over it. However that can be superfluous when the left inside edge of the protective sleeve has no roughness or in certain applications where only a lesser degree of sealing is required.

What is claimed is:

1. A device for quickly coupling a tube to a rigid element (100), the device comprising a tubular endpiece (1) subdivided along its axis (2) into a first portion (3) for connection to the tube and a second portion (4) for coupling to the element (100), and fastener means (3.1, 15) for fastening the tube to the endpiece (1) and for fastening the endpiece (1) to the element (100), the second portion (4) of the endpiece (1) possessing a groove (8) for receiving a gasket (9) that is to provide sealing between said second portion (4) of the endpiece and the element (100), wherein the endpiece (1) is fitted with a protective sleeve (10) for protecting the gasket (9), which sleeve is mounted on the second portion (4) of the endpiece to slide along the axis (2) of the endpiece between a position where it covers the groove (8), in which position it protects the gasket (9) housed in said groove before and during coupling of the endpiece (1) to the element (100), and a disengaged position which is offset from the groove (8) towards the first portion (3) of the endpiece (1) so as to make it possible, prior to coupling, for the gasket (9) to be put into place in the groove (8), and after coupling for the gasket (9) to come directly into contact with the element (100).

2. A coupling device according to claim 1, wherein the protective sleeve (10) is prevented from moving axially over the second portion (4) of the endpiece (1) while it is in an initial, waiting position by weak locking means (12).

3. A coupling device according to claim 2, wherein the protective sleeve (10) is made integrally with the second portion (4) of the endpiece (1) and wherein the locking means consists in a zone (12) linking the protective sleeve (10) to the second portion (4) of the endpiece (1), which zone is mechanically weak.

4. A coupling device according to claim 1, wherein the second portion (4) of the endpiece (1) possesses a shoulder (11) which forms an abutment for the protective sleeve (10) in its disengaged position.

5. The coupling device of claim 1, wherein said sleeve is movable on said tubular endpiece to a position where an entirety of said gasket is radially inward of said sleeve.

6. The coupling device of claim 1, wherein said gasket is an annular member with a round radial cross section.

7. The coupling device of claim 1, wherein said tubular endpiece further comprises a stopper extending radially outward from said tubular endpiece that engages said sleeve to prevent movement of said sleeve toward said first portion, and wherein movement of said sleeve toward and beyond said second portion is unopposed by a part of said tubular endpiece.

8. The coupling device of claim 1, further comprising a latch attached to an exterior surface of said tubular endpiece between said first portion and said second portion, said latch having a cantilevered catch that extends toward said second portion beyond said groove and radially outward from said second portion, said catch being arranged and adapted to engage the rigid element when the rigid element is coupling to said second portion.

9. A coupling device comprising:
   a tubular endpiece having a first end that is arranged and adapted to engage a tube and a second male end that is arranged and adapted to be inserted into a female rigid element;
   said tubular endpiece having a groove in an exterior surface at said second end, said groove having a gasket therein;
   a sleeve that is axially movable on said second end of said tubular endpiece between a first position where said gasket is entirely radially interior to said sleeve to a second position where said gasket extends radially outward from said groove, said second position being closer to said first end than said first position; and
   a latch attached to the exterior surface of said tubular endpiece between said first end and said second position of said sleeve, said latch having a cantilevered catch that extends toward said second end beyond said groove and radially outward from said second end, said catch being arranged and adapted to engage a female rigid element when the female rigid element is on said second end.

10. The coupling device of claim 9, wherein said tubular endpiece further comprises a stopper extending radially outward from said tubular endpiece that engages said sleeve to prevent movement of said sleeve toward said first end, and wherein movement of said sleeve toward said second end is unopposed by a past of said tubular endpiece.

11. The coupling device of claim 10, further comprising the female rigid member that comprises an internal shoulder that engages said sleeve to prevent movement of said sleeve toward said second end.

12. The coupling device of claim 9, wherein said gasket is an annular member with a round radial cross section.

* * * * *